United States Patent
Yamagata

(10) Patent No.: US 11,236,684 B1
(45) Date of Patent: Feb. 1, 2022

(54) TWO-STROKE ENGINE WITH SUPERCHARGER

(71) Applicant: MAZDA MOTOR CORPORATION, Hiroshima (JP)

(72) Inventor: Naoyuki Yamagata, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/277,215

(22) PCT Filed: Sep. 19, 2019

(86) PCT No.: PCT/JP2019/036718
§ 371 (c)(1),
(2) Date: Mar. 17, 2021

(87) PCT Pub. No.: WO2020/059784
PCT Pub. Date: Mar. 26, 2020

(30) Foreign Application Priority Data

Sep. 20, 2018  (JP) .............................. JP2018-175686

(51) Int. Cl.
*F02D 13/00* (2006.01)
*F02D 13/02* (2006.01)
(Continued)

(52) U.S. Cl.
CPC ............ *F02D 13/0215* (2013.01); *F02B 9/02* (2013.01); *F02B 75/02* (2013.01);
(Continued)

(58) Field of Classification Search
CPC .......... F02D 13/0215; F02D 2200/021; F02D 2200/70; F02B 9/02; F02B 75/02; F02B 2075/025
(Continued)

(56) References Cited

U.S. PATENT DOCUMENTS 10,704,523 B2 * 7/2020 Sueoka ................. F02B 23/101
10,704,524 B2 * 7/2020 Sueoka ............... F02D 41/0087
(Continued)

FOREIGN PATENT DOCUMENTS

JP  2002-332877 A  11/2002
JP  2004-257331 A   9/2004
(Continued)

OTHER PUBLICATIONS

International Search Report issued in PCT/JP2019/036718; dated Dec. 3, 2019.

*Primary Examiner* — Hai H Huynh

(74) *Attorney, Agent, or Firm* — Studebaker & Brackett PC

(57) ABSTRACT

A two-stroke engine with a supercharger is provided that can prevent occurrence of abnormal combustion under high load and can improve fuel efficiency when compression self-ignition combustion is carried out under low load, and spark ignition combustion is carried out under high load. When an operation state of an engine body is in a high-load side operation range, an intake variable valve mechanism and an exhaust variable valve mechanism are actuated to retard at least closing timing of an intake valve and at least opening timing of an exhaust valve from those in the case where the operation state of the engine body is in a low-load side operation range at the same engine speed as the engine speed detected by engine speed detection means while particular conditions are satisfied.

4 Claims, 12 Drawing Sheets

(51) Int. Cl.
*F02B 75/02* (2006.01)
*F02B 9/02* (2006.01)

(52) U.S. Cl.
CPC .. *F02B 2075/025* (2013.01); *F02D 2200/021* (2013.01); *F02D 2200/70* (2013.01)

(58) Field of Classification Search
USPC ..... 123/305, 436, 90.15, 345, 346, 347, 348
See application file for complete search history.

(56) References Cited

U.S. PATENT DOCUMENTS

| | | | |
|---|---|---|---|
| 10,731,590 B2 * | 8/2020 | Inoue | F02B 1/10 |
| 10,767,593 B2 * | 9/2020 | Inoue | F02P 5/045 |
| 10,794,323 B2 * | 10/2020 | Inoue | F02D 41/006 |

FOREIGN PATENT DOCUMENTS

| | | | |
|---|---|---|---|
| JP | 2005-076484 A | 3/2005 |
| JP | 2009-036144 A | 2/2009 |
| JP | 2009-036145 A | 2/2009 |
| JP | 2009-180220 A | 8/2009 |

* cited by examiner

TWO-STROKE ENGINE WITH SUPERCHARGER

TECHNICAL FIELD

The present disclosure relates to a two-stroke engine with a supercharger.

BACKGROUND

Conventionally, a two-stroke engine with a supercharger has been known (for example, see Japanese Patent Application Publication JP-A-2009-036144), and the supercharger is provided in an intake passage.

In JP-A-2009-036144, a two-stroke engine that has a supercharger (a two-stroke engine with a supercharger) is disclosed. In the two-stroke engine, the inside of a cylinder is scavenged when both an intake valve, which opens/closes an intake passage, and an exhaust valve, which opens/closes an exhaust passage, are opened in a scavenging period near piston bottom dead center, and a valve lifting characteristic of the exhaust valve is fixed. The supercharger is provided in the intake passage, is rotationally driven by rotation of a crankshaft, and is constructed of a Roots blower.

In JP-A-2009-036144, it is also disclosed that the two-stroke engine with the supercharger can be provided with a variable valve system for variable control of opening/closing timing of the intake valve.

SUMMARY

In a two-stroke engine with a supercharger, in the case where compression self-ignition combustion (CI combustion), in which the fuel is compressed to ignite by itself, is implemented, engine noise is extremely large, especially under high load. For this reason, it is considered to implement spark ignition combustion (SI combustion), in which the fuel is ignited by a spark, under high load while conducting the compression self-ignition combustion under low load.

In a four-stroke engine, in the case where the compression self-ignition combustion is implemented under low load and the spark ignition combustion is implemented under high load, and in the case where the closing timing of the intake valve is delayed to reduce an effective compression ratio under high load in order to prevent occurrence of abnormal combustion such as knocking, intake air that is supplied into a combustion chamber is blown back to an intake port, and a necessary intake amount cannot be secured. Thus, it is difficult to delay the closing timing of the intake valve. For this reason, in the four-stroke engine, in order to prevent the occurrence of the abnormal combustion such as knocking, ignition retardation is used to retard spark ignition to be later than compression top dead center under high load.

However, when the ignition retardation is used, just as described, an expansion ratio is reduced. As a result, a problem arises in that efficiency of the engine is degraded, which in turn degrades fuel efficiency.

The present disclosure has been made in view of such a point and therefore has a purpose of providing a two-stroke engine with a supercharger capable of preventing occurrence of abnormal combustion under high load and improving fuel efficiency in the case where compression self-ignition combustion is implemented under low load, and spark ignition combustion is implemented under high load.

In order to achieve the above purpose, the present disclosure is directed to a two-stroke engine with a supercharger, the two-stroke engine including: an engine body that has a cylinder constituting a combustion chamber, a piston inserted in and fitted to the cylinder, and an intake valve and an exhaust valve arranged on top of the cylinder and respectively opening/closing an intake port and an exhaust port; and a supercharger that is provided in an intake passage connected to the intake port of the engine body. The two-stroke engine with the supercharger further includes: an intake variable valve mechanism capable of varying at least closing timing of the intake valve; an exhaust variable valve mechanism capable of varying at least opening timing of the exhaust valve; engine speed detection means that detects an engine speed as a speed of the engine body; and control means that controls actuation of the engine body including the intake variable valve mechanism and the exhaust variable valve mechanism. An open period of each of the intake valve and the exhaust valve is set to satisfy particular conditions that are that the open period includes compression bottom dead center, that the opening timing of the intake valve is later than the opening timing of the exhaust valve, and that the closing timing of the intake valve is substantially the same as closing timing of the exhaust valve or later than the closing timing of the exhaust valve. The control means is configured to conduct compression self-ignition combustion, in which fuel is compressed to ignite by itself in the combustion chamber, when an operation state of the engine body is in a low-load side operation range where a load is smaller than a specified load and to conduct spark ignition combustion of the fuel in the combustion chamber when the operation state of the engine body is in a high-load side operation range, in which the load is equal to or larger than the specified load. The supercharger is configured to be actuated when the operation state of the engine body is in the low-load side operation range or the high-load side operation range. The control means is further configured to actuate the intake variable valve mechanism and the exhaust variable valve mechanism in order to retard at least the closing timing of the intake valve and at least the opening timing of the exhaust valve from those in a case where the operation state of the engine body is in the low-load side operation range at the same engine speed as the engine speed detected by the engine speed detection means while the particular conditions are satisfied, when the operation state of the engine body is in the high-load side operation range.

With the above configuration, when the operation state of the engine body is in the high-load side operation range, at least the closing timing of the intake valve and at least the opening timing of the exhaust valve are retarded from those in the case where the operation state of the engine body is in the low-load side operation range at the same engine speed while the particular conditions are satisfied. Thus, it is possible to reduce an effective compression ratio and increase an expansion ratio in the high-load side operation range.

Accordingly, in the disclosed two-stroke engine with the supercharger, when the closing timing of the intake valve is retarded, a position of the piston at initiation of compression becomes a position near compression top dead center, and the effective compression ratio is reduced. Meanwhile, even in the case where the intake valve is opened at the time when intake air that is supercharged by the supercharger is supplied to the combustion chamber, and the piston is operated toward the compression top dead center, the intake air, which has been supplied to the combustion chamber is not blown back to the intake port. Accordingly, the effective compression ratio can be reduced by retarding the closing timing of the intake valve while an intake amount remains constant. As a result, even when the closing timing of the intake valve is retarded, required engine torque can be achieved without varying the engine torque.

For this reason, when the operation state of the engine body is in the high-load side operation range, the effective compression ratio can be reduced by retarding at least the closing timing of the intake valve while a change in the engine torque is reduced. As a result, even when ignition retardation is not conducted, it is possible to prevent occurrence of abnormal combustion such as knocking. Accordingly, the spark ignition combustion can be conducted near the compression top dead center in a compression stroke.

Since the spark ignition combustion is conducted near the compression top dead center in the compression stroke, just as described, the expansion ratio can be increased while at least the opening timing of the exhaust valve is retarded.

Therefore, when the operation state of the engine body is in the high-load side operation range, it is possible to improve the fuel efficiency while preventing the occurrence of the abnormal combustion such as knocking.

An embodiment of the two-stroke engine with the supercharger further includes: outside temperature detection means that detects an outside temperature; and compression end temperature estimation means that estimates a compression end temperature as a temperature of gas in the combustion chamber at compression top dead center on the basis of a detection result by each of the outside temperature detection means and the engine speed detection means and a current effective compression ratio of the engine body when the operation state of the engine body is in the low-load side operation range. The control means is configured to actuate the variable valve mechanism in order to vary at least the closing timing of the intake valve within a specified range according to the compression end temperature estimated by the compression end temperature estimation means when the operation state of the engine body is in the low-load side operation range. The closing timing of the intake valve at the time when the operation state of the engine body is in the high-load side operation range is retarded from the closing timing of the intake valve at the time when the closing timing is retarded at a maximum according to the compression end temperature at the time when the operation state of the engine body is in the low-load side operation range at the same engine speed as the engine speed in the high-load side operation range.

For this reason, when the operation state of the engine body is in the low-load side operation range, the self-ignition and the combustion of the fuel can further be stabilized.

In another embodiment of the two-stroke engine with the supercharger, the intake variable valve mechanism is constructed of a variable valve mechanism of a phase type that varies both of the opening timing and the closing timing of the intake valve in an interlocking manner while keeping the open period of the intake valve constant, and the exhaust variable valve mechanism is constructed of a variable valve mechanism of the phase type that varies both of the opening timing and the closing timing of the exhaust valve in an interlocking manner while keeping the open period of the exhaust valve constant.

For this reason, since valve timing of the intake valve and valve timing of the exhaust valve are varied in a similar manner, it is possible to retard the closing timing of the intake valve and the opening timing of the exhaust valve while the particular conditions are satisfied. Therefore, configurations of the intake variable valve mechanism and the exhaust variable valve mechanism can be simple configurations.

As it has been described so far, according to the two-stroke engine with the supercharger in the present disclosure, when the operation state of the engine body is in the high-load side operation range, at least the closing timing of the intake valve and at least the opening timing of the exhaust valve are retarded from those in the case where the operation state of the engine body is in the low-load side operation range at the same engine speed as the engine speed detected by the engine speed detection means while the particular conditions are satisfied. Therefore, when the operation state of the engine body is in the high-load side operation range, it is possible to improve the fuel efficiency while preventing the occurrence of the abnormal combustion such as knocking.

DETAILED DESCRIPTION

A detailed description will hereinafter be made on an embodiment of the present disclosure with reference to the drawings.

Figure 1:
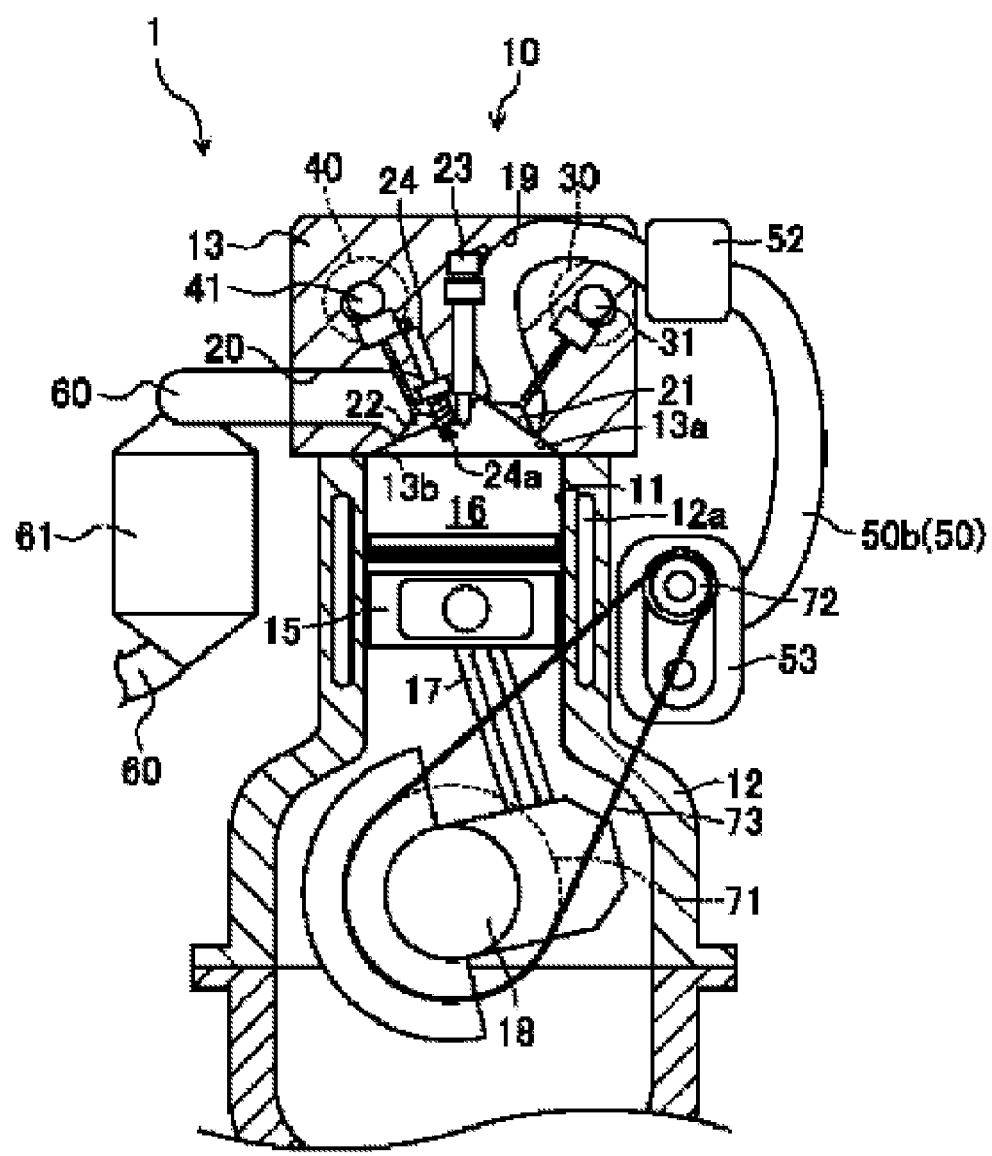
FIG. 1 is a schematic configuration diagram of a two-stroke engine with a supercharger according to an embodiment of the present disclosure.

FIG. 1 illustrates a two-stroke engine with a supercharger 1 (hereinafter abbreviated as an engine 1) according to an embodiment of the present disclosure. This engine 1 is an engine that is mounted on a vehicle. In this embodiment, the engine 1 is a gasoline engine to which fuel containing gasoline (may contain ethanol) is supplied.

The engine 1 includes an engine body 10, and this engine body 10 has: a cylinder block 12 that is provided with plural cylinders 11 (only one thereof is illustrated in FIG. 1); and a cylinder head 13 that is disposed on this cylinder block 12. The plural cylinders 11 are disposed such that a cylinder-axis direction thereof corresponds to a vertical direction and that a perpendicular direction to a direction of the sheet corresponds to a cylinder bank direction. In each of the cylinders 11 in the engine body 10, a piston 15 is inserted and fitted in a reciprocally slidable manner. This piston 15, the cylinder block 12, and the cylinder head 13 define a combustion chamber 16. The combustion chamber 16 is a so-called pent roof type combustion chamber 16, and a wall surface of the cylinder head 13, which constitutes the combustion chamber 16, has two inclined surfaces 13a, 13b. In the cylinder block 12, the piston 15 is coupled to a crankshaft 18, which extends in the cylinder bank direction, via a connecting rod 17. A water jacket 12a, through which an engine coolant circulates, is formed around the cylinders 11 in the cylinder block 12.

The engine body 10 has a valve mechanism of a so-called overhead camshaft type. The cylinder head 13 is formed with an intake port 19 and an exhaust port 20, each of which communicates with the combustion chamber 16, per cylinder 11. In each of the intake ports 19, an intake valve 21 is disposed to open/close an opening on the combustion chamber 16 side of respective one of the intake ports 19. In each of the exhaust ports 20, an exhaust valve 22 is disposed to open/close an opening on the combustion chamber 16 side of respective one of the exhaust ports 20. The intake valve 21 and the exhaust valve 22 per cylinder 11 are arranged on top of the cylinder 11. The opening on the combustion chamber 16 side of each of the intake ports 19 is formed in one (hereinafter referred to as an intake-side inclined surface 13a) of the two inclined surfaces 13a, 13b of the cylinder head 13. The opening on the combustion chamber 16 side of each of the exhaust ports 20 is formed in the other (hereinafter referred to as an exhaust-side inclined surface 13b) of the two inclined surfaces 13a, 13b of the cylinder head 13.

The intake port 19 is connected to an intake passage 50, which will be described below. As illustrated in FIG. 1, in the cylinder head 13, the intake port 19 extends from a connected portion with the intake passage 50 toward one side in an orthogonal direction (hereinafter referred to as an engine width direction) to both of a center axis direction of the cylinder 11 and the cylinder bank direction. Then, the intake port 19 extends toward the cylinder block 12 side in a manner to be slightly inclined to the other side in the engine width direction. Thereafter, the intake port 19 extends toward the one side in the engine width direction while being curved near the combustion chamber 16.

Figure 6:
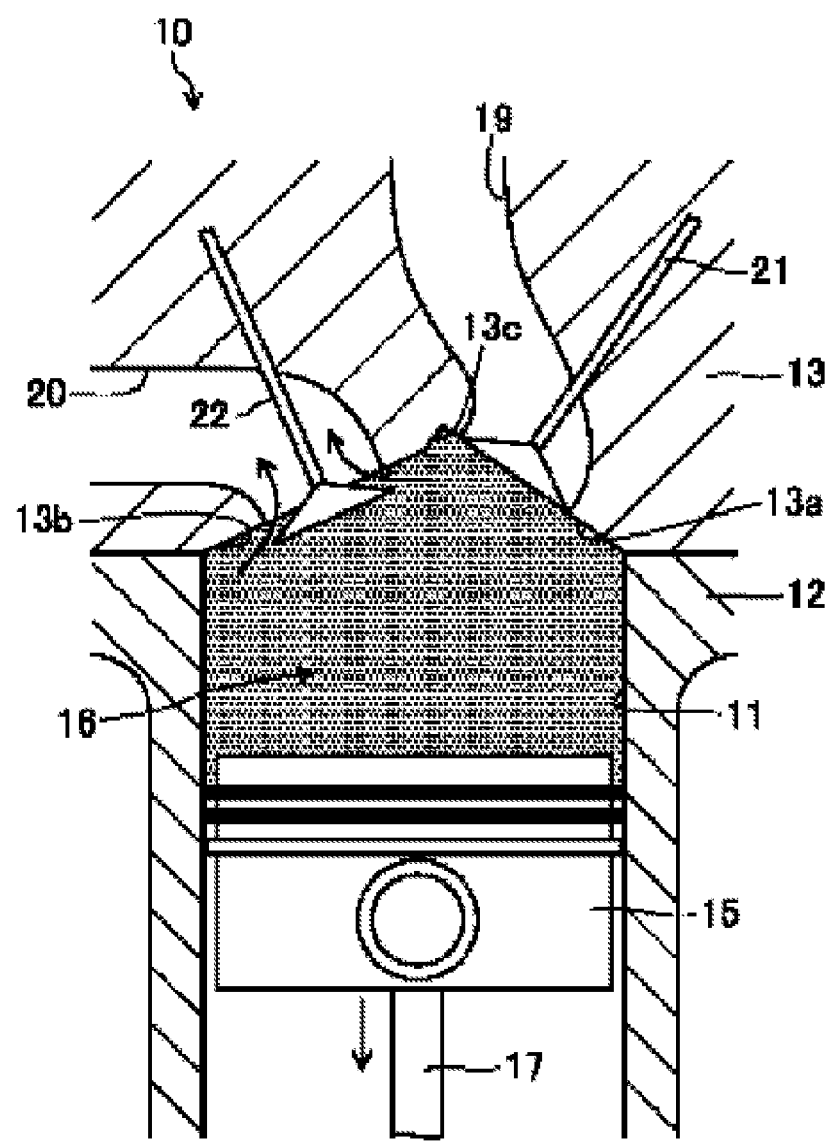
FIG. 6 is a view illustrating a state of inside of a cylinder in a scavenging stroke, and is also a view illustrating a state where only the exhaust valve is opened according to an embodiment of the present disclosure.
Figure 7:
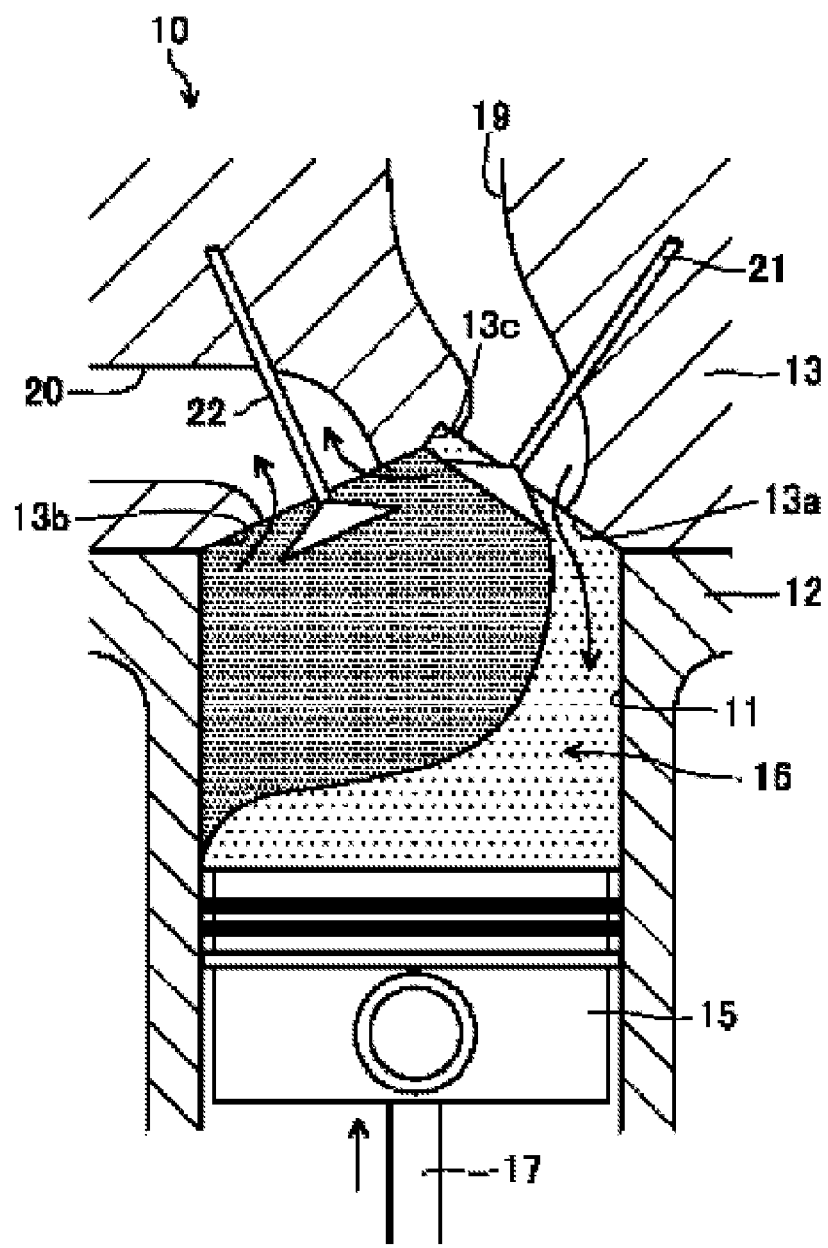
FIG. 7 is a view illustrating the state of the inside of the cylinder in the scavenging stroke, and is also a view illustrating a state where both of the intake valve and the exhaust valve are opened according to an embodiment of the present disclosure.

As illustrated in FIG. 6 and FIG. 7, a step portion 13c is formed in a boundary portion between the intake-side inclined surface 13a and the exhaust-side inclined surface 13b. Although a detailed description will be made below, this step portion 13c is a portion that suppresses a flow of the intake air, which flows into the combustion chamber 16 from the intake port 19, toward the exhaust port 20.

The exhaust port 20 is connected to an exhaust passage 60, which will be described below. As illustrated in FIG. 1, the exhaust port 20 slightly extends from the opening on the combustion chamber 16 side toward an opposite side from the cylinder block 12. Thereafter, the exhaust port 20 extends straight toward the one side in the engine width direction.

In the cylinder head 13, an intake camshaft 31, which actuates respective one of the intake valves 21, and an exhaust camshaft 41, which actuates respective one of the exhaust valves 20, are provided in a manner to extend in a shaft direction (the cylinder bank direction) of the crankshaft 18. Each of the camshafts 31, 41 is coupled to the crankshaft 18 via a power transmission mechanism such as a chain/sprocket mechanism, which is not illustrated. In this way, each of the camshafts 31, 41 rotates in an interlocking manner with rotation of the crankshaft 18.

An intake variable valve mechanism that varies the valve timing is attached to the intake camshaft 31. In this embodiment, this intake variable valve mechanism has an intake electric sequential-valve timing (S-VT) 30. The intake electric S-VT 30 is configured to continuously vary a rotation phase of the intake camshaft 31 within a specified angle range. That is, the intake electric S-VT 30 is a variable valve mechanism of a phase type, and varies both of opening timing and closing timing in an interlocking manner while keeping an open period to be constant. This intake electric S-VT 30 continuously vary the opening timing and the closing timing of the intake valve 21. The intake variable valve mechanism may have a hydraulic S-VT instead of the electric S-VT.

An exhaust variable valve mechanism that varies the valve timing is attached to the exhaust camshaft 41. In this embodiment, this exhaust variable valve mechanism has an exhaust electric S-VT 40. The exhaust electric S-VT 40 is configured to continuously vary a rotation phase of the exhaust camshaft 41 within a specified angle range. That is, the exhaust electric S-VT 40 is the variable valve mechanism of the phase type, and varies both of the opening timing and the closing timing in the interlocking manner while keeping the open period to be constant. By this exhaust electric S-VT 40, the opening timing and the closing timing of the exhaust valve 22 are continuously be varied. The exhaust variable valve mechanism may have a hydraulic S-VT instead of the electric S-VT.

As illustrated in FIG. 1, the cylinder head 13 is provided with a fuel injection valve 23, which directly injects the fuel into the combustion chamber 16, per cylinder 11. The fuel injection valve 23 is disposed such that an injection port thereof faces inside of the combustion chamber 16 from a roof portion of the combustion chamber 16. When receiving a control signal from an ECU 100, which will be described below, the fuel injection valve 23 directly injects the fuel into the combustion chamber 16 at injection timing, which is set according to an operation state of the engine body 10 in a compression stroke (after both of the intake valve 21 and the exhaust valve 22 are closed), and an amount of the fuel corresponds to the operation state of the engine body 10. Instead of or in addition to the fuel injection valve 23, a fuel injection valve that injects the fuel into the intake port 19 may be provided.

An ignition plug 24 for burning the fuel, which is injected into the cylinder 11, by spark ignition is attached to the cylinder head 13 per cylinder 11. As illustrated in FIG. 1, the ignition plug 24 is disposed to face the inside of the combustion chamber 16 from one side (an exhaust side in this embodiment) of the cylinder head 13. When receiving the control signal from the ECU 100, the ignition plug 24 energizes an electrode 24*a* to generate a spark at desired ignition timing.

As illustrated in FIG. 1, the intake passage 50 is connected to a surface on the other side in the engine width direction of the engine body 10 in a manner to communicate with the intake port 19 for each of the cylinders 11. Meanwhile, the exhaust passage 60 is connected to a surface on the one side in the engine width direction of the engine body 10. The exhaust passage 60 is connected in a manner to communicate with the exhaust port 20 of each of the cylinders 11, and burned gas (that is, exhaust gas) from each of the cylinders 11 is discharged through the exhaust passage 60.

A mechanical supercharger 53 is disposed between the air cleaner in the intake passage 50 and a surge tank 52. In the following description, a portion on an upstream side of the mechanical supercharger 53 in the intake passage 50 will be referred to as an upstream intake passage 50*a* (see FIG. 2), and a portion on a downstream side of the mechanical supercharger 53 in the intake passage 50 will be referred to as a downstream intake passage 50*b*.

Figure 2:
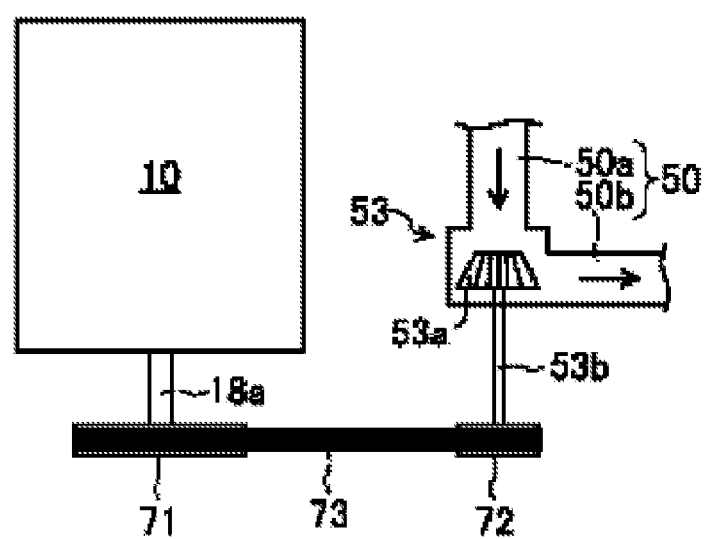
FIG. 2 is a schematic view illustrating a coupling relationship between a mechanical supercharger and the two-stroke engine with the supercharger according to an embodiment of the present disclosure.

The mechanical supercharger 53 is a supercharger that does not use exhaust energy, and in detail, is a supercharger that is rotationally driven by the rotation of the crankshaft 18 that is provided to the engine body 10. As illustrated in FIG. 2, the mechanical supercharger 53 and the crankshaft 18 are coupled by a first pulley 71, a second pulley 72, and a belt 73 that couples the first pulley 71 and the second pulley 72. More specifically, the first pulley 71 is attached to an output shaft 18*a* of the crankshaft 18, and the second pulley 72 is attached to an input shaft 53*b* of a compressor 53*a* (constructed of a centrifugal blower) in the mechanical supercharger 53. In FIG. 2, the surge tank 52 and the exhaust passage 60 are not illustrated.

Since the mechanical supercharger 53 is rotationally driven by the rotation of the crankshaft 18, a rotational speed thereof is proportional to a rotational speed of the crankshaft 18 (that is, a speed of the engine body 10). A diameter of each of the first and second pulleys 71, 72 is set such that a rotational speed of the compressor 53*a* is a desired rotational speed. Here, an electromagnetic clutch may be arranged between the second pulley 72 and the input shaft 53*b* so as to be able to regulate the rotational speed of the compressor 53*a*.

In this embodiment, the mechanical supercharger 53 is actuated in an entire operation range of the engine body 10 (a low-load side operation range and a high-load side operation range, which will be described below). Here, instead of the mechanical supercharger 53, an electric supercharger, in which the compressor is constructed of the centrifugal blower, may be used. In this case, the electric supercharger is controlled by the ECU 100, which will be described below, and, similar to the mechanical supercharger 53, is actuated in the entire operation range of the engine body 10.

An upstream portion of the exhaust passage 60 is constructed of an exhaust manifold that has: independent exhaust passages, each of which is branched per cylinder 11 and is connected to an outer end of the exhaust port 20; and a gather portion in which each of the independent exhaust passages gathers.

In a portion on a downstream side of the exhaust manifold in this exhaust passage 60, an exhaust gas control catalyst 61 is disposed. The exhaust gas control catalyst 61 is an oxidation catalyst and promotes oxidation of CO and HC in the exhaust gas and reaction to produce $CO_2$ and $H_2O$. Although not illustrated, in a portion on a downstream side of the exhaust gas control catalyst 61 in the exhaust passage 60, a fine particle collection filter that collects fine particles such as soot (dust) contained in the exhaust gas from the combustion chamber 16 of the engine body 10 is disposed. In this embodiment, the engine 1 does not include a catalyst for removing NOx, but may include a catalyst for removing NOx.

Figure 3:
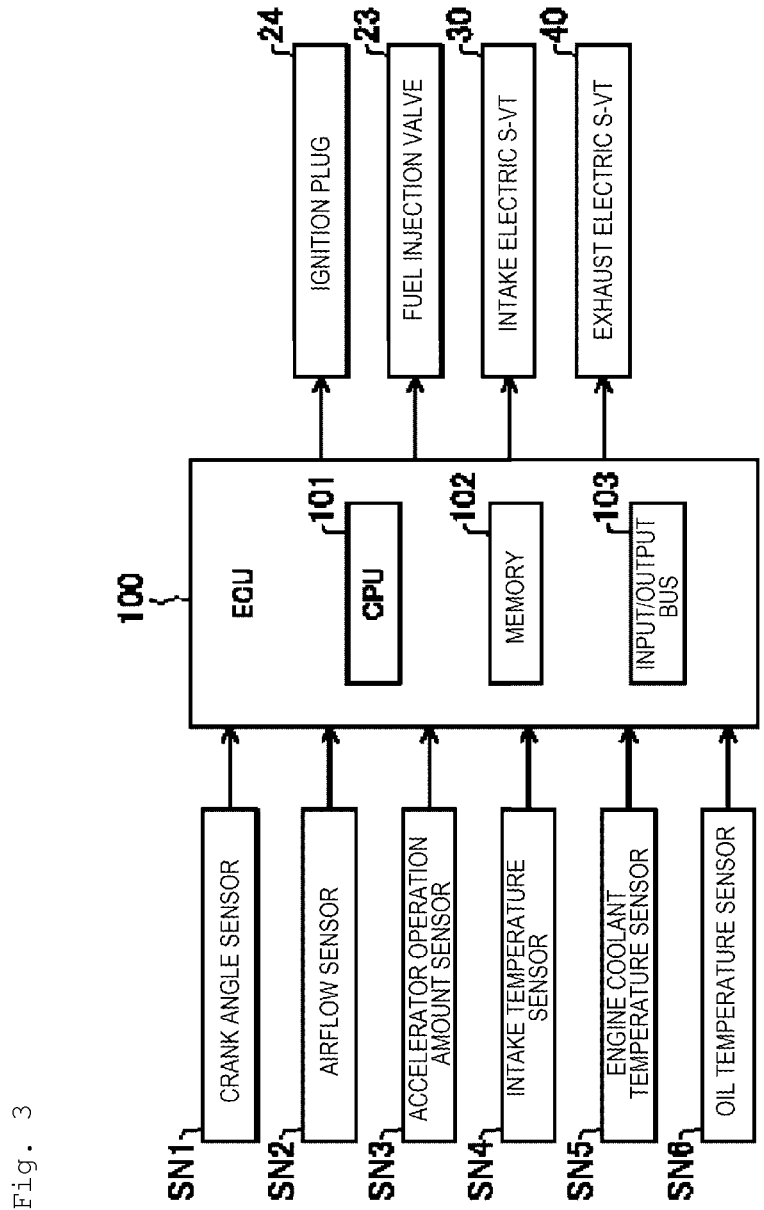
FIG. 3 is a block diagram illustrating a control system for the two-stroke engine with the supercharger according to an embodiment of the present disclosure.

As illustrated in FIG. 3, the engine 1 (the engine body 10) is controlled by the engine control unit (ECU) 100. The ECU 100 is a controller that has a well-known microcomputer as a base unit. The ECU 100 includes a CPU 101, memory 102, an input/output bus 103, and the like. The CPU 101 is a central processing unit that executes computer programs (including a basic control program such as an OS and an application program that is run on the OS to implement a particular function). The memory 102 is configured to include RAM and ROM. The ROM stores the various computer programs (in particular, a control program for controlling the engine 1), data including: a combustion region map, which is used during execution of the computer program and will be described below; and a variation map, and the like. The RAM is memory provided with a processing area that is used when the CPU 101 executes a series of processing. The input/output bus 103 inputs/outputs an electric signal to the ECU 100.

Various sensors are electrically connected to the ECU 100, and various sensors include a crank angle sensor SN1, an airflow sensor SN2, an accelerator operation amount sensor SN3, an intake temperature sensor SN4, an engine coolant temperature sensor SN5 (engine coolant temperature detection means), an oil temperature sensor SN6 (oil temperature detection means), and the like. The crank angle sensor SN1 is provided to the cylinder block 12 and detects a rotation angle of the crankshaft 18. The airflow sensor SN2 detects an flow rate of the intake air through the upstream intake passage 50*a*. The accelerator operation amount sensor SN3 is attached to an accelerator pedal mechanism of the vehicle and detects an accelerator operation amount that corresponds to an operation amount of an accelerator pedal. The intake temperature sensor SN4 detects a temperature of the intake air through the upstream intake passage 50*a*. Since an outside temperature can be estimated from this temperature of the intake air, the intake temperature sensor SN4 constitutes outside temperature detection means. The engine coolant temperature sensor SN5 detects a temperature of the engine coolant that flows through the water jacket 12*a*. The oil temperature sensor NS6 detects a temperature of engine oil. Each of these sensors SN1 to SN6 and the like outputs a detection signal to the ECU 100.

The ECU 100 calculates the speed of the engine body 10 (hereinafter referred to as an engine speed) from a detection result by the crank angle sensor SN1. In this way, the crank angle sensor SN1 constitutes engine speed detection means. The ECU 100 calculates a load of the engine body 10 (hereinafter referred to as an engine load) from a detection result by the accelerator operation amount sensor SN3.

The ECU 100 determines the operation state of the engine body 10 on the basis of the input signals from the sensors SN1 to SN6 and the like, and outputs the control signal to each device in the engine 1, such as the fuel injection valve 23, the ignition plug 24, the intake electric S-VT 30, and the exhaust electric S-VT 40, so as to control each of the devices. The ECU 100 constitutes control means that controls actuation of the engine body 10 including the intake variable valve mechanism and the exhaust variable valve mechanism.

Figure 4:
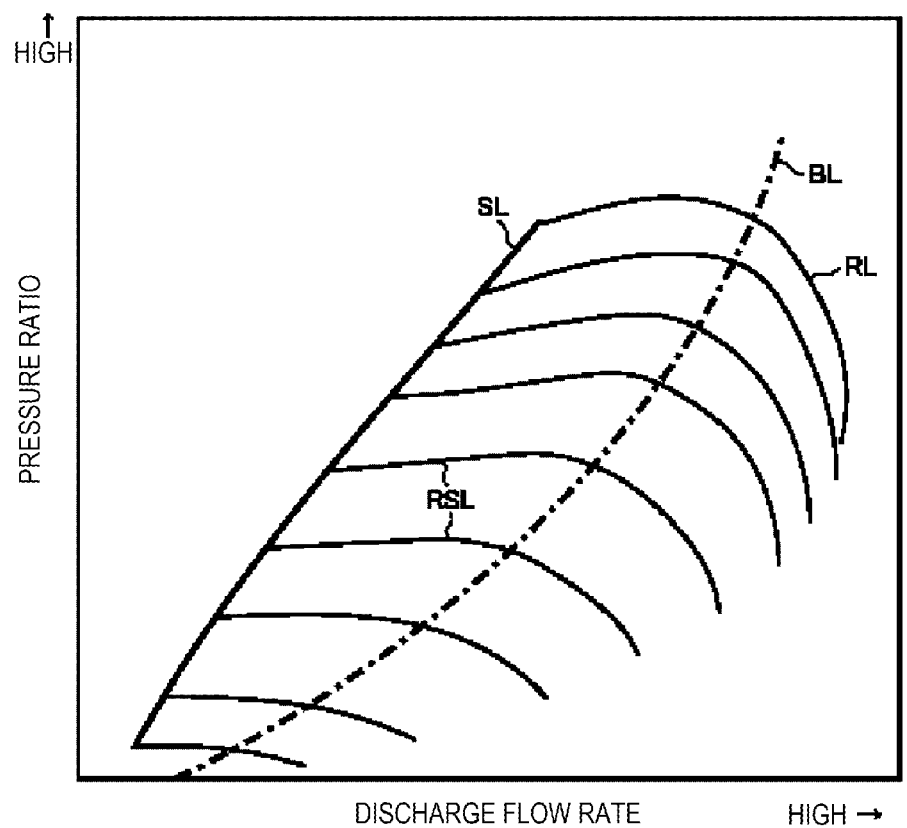
FIG. 4 is a performance curve graph illustrating a characteristic of a compressor in the mechanical supercharger according to an embodiment of the present disclosure.

FIG. 4 illustrates a performance characteristic of the compressor 53a in the mechanical supercharger 53. A vertical axis represents a ratio of a pressure in the downstream intake passage 50b to a pressure in the upstream intake passage 50a (hereinafter simply referred to as a pressure ratio), and a horizontal axis represents a discharge flow rate from the compressor 53a. In FIG. 4, a curve RL represents a rotation limit line, and a line SL (a substantially straight line) represents a surge line. A region surrounded by these lines is an operable region of the mechanical supercharger 53. Operation efficiency of the mechanical supercharger 53 is increased as an operation point is located toward a center side of the operable region. In this embodiment, the pressure in the upstream intake passage 50a is basically an atmospheric pressure. Thus, the pressure ratio being high or low represents a supercharging pressure by the mechanical supercharger 53 being high or low.

In addition, each of plural curves RSL drawn in this operable region is a line that connects the operation points at which the rotational speed of the compressor 53a is equal. As the curve RSL becomes closer to the rotation limit line RL, the rotational speed is increased. Furthermore, a one-dot chain line BL that extends vertically in a manner to cross the operable region of the mechanical supercharger 53 vertically is a line that connects the operation points, at which operation efficiency of the compressor 53a is the highest, per rotational speed of the compressor 53a.

Since the compressor 53a includes the centrifugal blower, the compressor 53a basically has such a tendency that, as the rotational speed of the compressor 53a is increased, the pressure ratio is increased, and the discharge flow rate is increased. This means that the supercharging pressure is increased as the engine speed is increased. When the engine speed is low, an actual time in which each of the intake valve 21 and the exhaust valve 22 is opened in one combustion cycle of the engine body 10 is long. Thus, even at the low supercharging pressure, the exhaust gas can be scavenged. Meanwhile, when the engine speed is high, the actual time, in which each of the intake valve 21 and the exhaust valve 22 is opened in the one combustion cycle of the engine body 10, is short. Thus, it is necessary to introduce the intake air into the combustion chamber 16 at as high a supercharging pressure as possible and promptly scavenge the exhaust gas. For these reasons, the compressor 53a has the characteristic as described above. Therefore, the exhaust gas can appropriately be scavenged.

The supercharging pressure and the flow rate of the intake air to be supplied to the combustion chamber 16 in order to efficiently scavenge the exhaust gas can be calculated in advance from engine specifications (a volume of the combustion chamber 16 and the like) of the engine body 10. Accordingly, in this embodiment, the required supercharging pressure and the required intake flow rate are calculated on the basis of the engine specifications of the engine body 10. Then, the mechanical supercharger 53, the operation point of which is located on the broken line BL, is thereby selected. In this way, it is possible to efficiently supercharge in accordance with the engine speed.

In this embodiment, according to the operation state of the engine body 10, compression self-ignition combustion (CI combustion), in which the fuel is compressed to ignite by itself in the combustion chamber 16 without actuating the ignition plug 24, and spark ignition combustion (SI combustion), in which the fuel is ignited by the spark in the combustion chamber 16 using the ignition plug 24, are implemented. Here, the "compression self-ignition" includes spark controlled compression ignition (SPCCI) combustion in which the fuel is compressed to burn by itself while being assisted with the spark using the ignition plug 24.

In this embodiment, the ROM in the memory 102 stores the combustion region map that has a two-axis coordinate system including the engine speed and the engine load. In this combustion region map, the low-load side operation range, in which the engine load is smaller than a specified load, is set as a compression self-ignition combustion region, and a high-load side operation range, in which the engine load is equal to or larger than the specified load, is set as a spark ignition combustion region. The specified load varies according to the engine speed (for example, the specified load is increased as the engine speed is increased). However, the specified load may be constant regardless of the engine speed.

Figure 5:
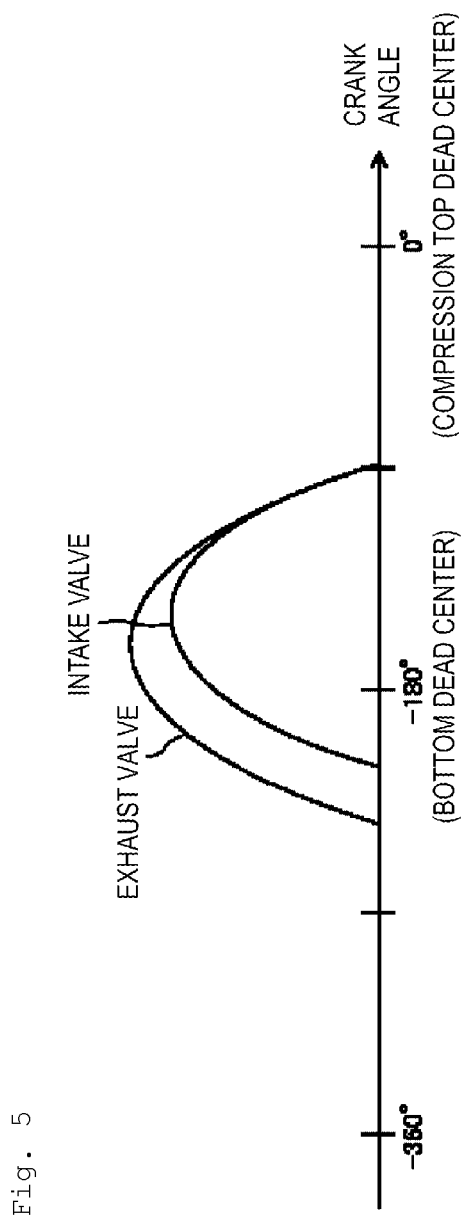
FIG. 5 is a chart illustrating an example of lift characteristics of an intake valve and an exhaust valve according to an embodiment of the present disclosure.

FIG. 5 illustrates an example of lift characteristics of the intake valve 21 and the exhaust valve 22. A horizontal axis represents a crank angle, and the crank angle at compression top dead center (TDC) is set as 0°. An advanced side therefrom (earlier timing than the compression top dead center) is represented to be negative, and a retarded side therefrom (later timing than the compression top dead center) is represented to be positive. In FIG. 5, −360° corresponds to the compression top dead center in the last combustion cycle.

The opening period of each of the intake valve 21 and the exhaust valve 22 is set to satisfy particular conditions. The particular conditions are that the opening period includes compression bottom dead center (BDC), that the opening timing of the intake valve 21 is later than the opening timing of the exhaust valve 22, and that the closing timing of the intake valve 21 is substantially the same as the closing timing of the exhaust valve 22 or later than the closing timing of the exhaust valve 22. That is, the intake valve 21 and the exhaust valve 22 have the lift characteristics that satisfy the particular conditions by the intake and exhaust camshafts 31, 41, the intake electric S-VT 30, and the exhaust electric S-VT 40. In this embodiment, the closing timing of each of the intake valve 21 and the exhaust valve 22 is defined as a time point at which a respective one of the intake valve 21 and the exhaust valve 22 is lifted 1 mm (a time point near a boundary between a ramp section and a lift section). The opening timing of each of the intake valve 21 and the exhaust valve 22 is also defined as the time point at which a respective one of the intake valve 21 and the exhaust valve 22 is lifted 1 mm (the time point near the boundary between the ramp section and the lift section).

In the lift characteristics illustrated in FIG. 5, the opening timing of the intake valve 21 is later by approximately 20° of the crank angle than the opening timing of the exhaust valve 22, and the closing timing of the intake valve 21 is substantially the same as the closing timing of the exhaust valve 22. Here that "the closing timing of the intake valve 21 is substantially the same as the closing timing of the exhaust valve 22" includes both a case where the closing timing of the intake valve 21 is slightly earlier than the closing timing of the exhaust valve 22 and a case where the closing timing of the intake valve 21 is slightly later than the closing timing of the exhaust valve 22. That is, "the closing timing of the intake valve 21 is substantially the same as the closing timing of the exhaust valve 22" means a case where a difference between the closing timing of the intake valve 21 and the closing timing of the exhaust valve 22 is approximately 2° to 3° by the crank angle. Even in the case where the closing timing of the intake valve 21 is substantially the same as the closing timing of the exhaust valve 22, the closing timing of the intake valve 21 is preferably later than the closing timing of the exhaust valve 22.

As long as the particular conditions are satisfied, the lift characteristics can have any characteristic. For example, the closing timing of the intake valve 21 may be later than the closing timing of the exhaust valve 22. The difference between the closing timing of the intake valve 21 and the closing timing of the exhaust valve 22 in this case is larger than the difference therebetween in the case where the closing timing of the intake valve 21 is substantially the same as the closing timing of the exhaust valve 22.

In this embodiment, since the engine 1 is a two-stroke engine, the engine 1 is provided with the scavenging stroke in which both of the intake valve 21 and the exhaust valve 22 are opened and the exhaust gas in the combustion chamber 16 is pushed out to the exhaust port 20 by using the intake air that flows from the intake port 19 into the combustion chamber 16. In the combustion cycle of the engine body 10, when the cycle proceeds to the scavenging stroke, as described above, the exhaust valve 22 is opened at earlier timing than the intake valve 21. This is to prevent an inflow of the exhaust gas into the intake port 21.

FIG. 6 and FIG. 7 illustrate a situation of the inside of the combustion chamber 16 in the scavenging stroke.

As illustrated in FIG. 6, after the fuel is burned in the last combustion cycle before the current combustion cycle, first, only the exhaust valve 22 is opened. At this time, while the piston 15 is lowered, the exhaust gas flows toward the exhaust port 20. Even when the piston 15 is already lowered, the exhaust gas flows into the exhaust port 20 by a combustion pressure.

Next, as illustrated in FIG. 7, in addition to the exhaust valve 22, the intake valve 21 is opened. When the intake valve 21 is opened, the intake air is supplied to the combustion chamber 16 from the intake port 19. At this time, since the step portion 13c is formed in the cylinder head 13, the intake air does not flow toward the exhaust port 20 but is mainly supplied to the combustion chamber 16 from a portion on a far side from the exhaust port 20 in a clearance between the intake valve 21 and the cylinder head 13. Since the intake air is supplied to the combustion chamber 16, just as described, as illustrated in FIG. 7, the exhaust gas in the combustion chamber 16 is scavenged toward the exhaust port 20 by the intake air.

In addition, as illustrated in FIG. 5 and FIG. 7, in a first half of a period in which the piston 15 is lifted toward the compression top dead center, in addition to the intake valve 21, the exhaust valve 22 is opened. In this way, the exhaust gas in the combustion chamber 16 is pushed out to the exhaust port 20 by the intake air supplied to the combustion chamber 16 and lifting of the piston 15.

Next, in the middle of lifting of the piston 15, as illustrated in FIG. 5, the intake valve 21 and the exhaust valve 22 are closed. Usually, the intake valve 21 is closed after the exhaust valve 22 is closed. After the intake valve 21 and the exhaust valve 22 are closed, the intake air is compressed by lifting of the piston 15.

In the compression stroke thereafter, the fuel injection valve 23 injects the fuel into the combustion chamber 16. In the case of the fuel injection valve that injects the fuel into the intake port 19, the fuel is injected into the intake port 19 at the time when the intake valve 21 is opened.

Then, when the operation state of the engine body 10 is in the low-load side operation range (the compression self-ignition combustion region) in the combustion region map, the fuel is compressed to ignite by itself and burned at or near the compression top dead center. When the operation state of the engine body 10 is in the high-load side operation range (the spark ignition combustion region) in the combustion region map, the ignition plug 24 is actuated at or near the compression top dead center in the compression stroke to subject the fuel to the spark ignition combustion. In this embodiment, in the case where the engine coolant temperature by the engine coolant temperature sensor SN5 is lower than a predetermined set temperature, the spark ignition combustion is implemented regardless of the combustion region map.

In the case where the operation state of the engine body 10 is in the low-load side operation range, and the spark ignition combustion is conducted, a possibility that abnormal combustion such as knocking occurs is increased at the same effective compression ratio as that of a case where the operation state of the engine body 10 is in the high-load side operation range and the compression self-ignition combustion is implemented. In the case where the ignition retardation is used in order to prevent the occurrence of the abnormal combustion, an expansion ratio is reduced, which in turn degrades fuel efficiency.

Accordingly, in this embodiment, when the operation state of the engine body 10 is in the high-load side operation range, the ECU 100 actuates the intake electric S-VT 30 and the exhaust electric S-VT 40 in order to retard the closing timing of the intake valve 21 and the opening timing of the exhaust valve 22 from those in the case where the operation state of the engine body 10 is in the low-load side operation range at the same engine speed as the engine speed calculated from the detection result by the crank angle sensor SN1 while the particular conditions are satisfied. In this embodiment, both of the intake electric S-VT 30 and the exhaust electric S-VT 40 are of the phase type. Thus, when the closing timing of the intake valve 21 is retarded, the opening timing of the intake valve 21 is retarded in an interlocking manner. In addition, when the opening timing of the exhaust valve 22 is delayed, the closing timing of the exhaust valve 22 is retarded in the interlocking manner. Furthermore, in this embodiment, the closing timing (and the opening timing) of each of the intake valve 21 and the exhaust valve 22 is varied by the same amount.

In this embodiment, the closing timing of the intake valve 21 is varied according to the engine speed (in this embodiment, the closing timing of the exhaust valve 22 is also varied). More specifically, as the engine speed is increased, the closing timing of the intake valve 21 is retarded. This is because a compression end temperature is low at the low speed at which a time for the compression stroke is long, and the compression end temperature is high at the high speed at which the time for the compression stroke is short. In addition, at the high speed, the supercharging pressure is increased due to a reduction in a time for the scavenging stroke, and due to an increase in this supercharging pressure, the intake temperature is increased, and the compression end temperature is increased. Accordingly, as the engine speed is increased, the closing timing of the intake valve 21 is retarded.

Figure 8:
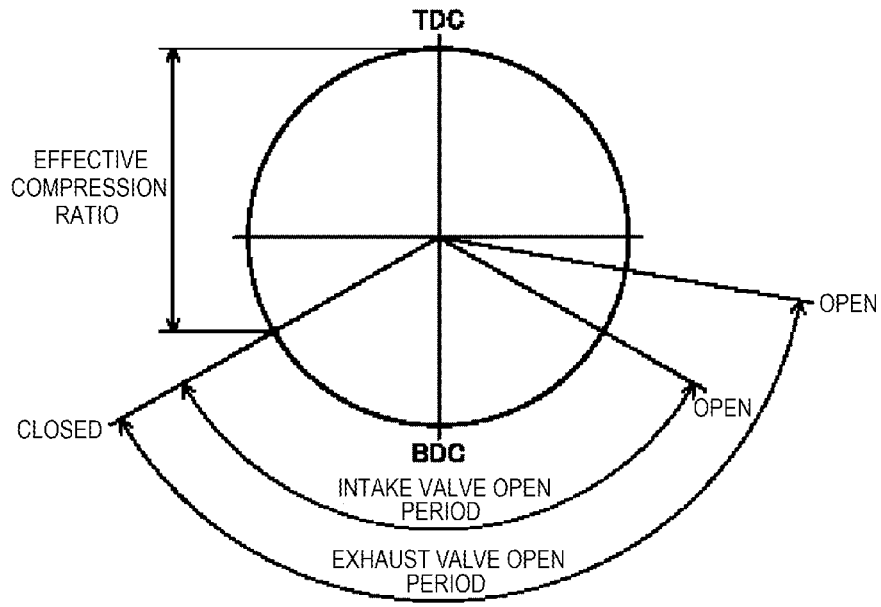
FIG. 8 is a chart illustrating open periods (valve timing) of the intake valve and the exhaust valve in a single rotation (clockwise rotation) of a crankshaft at the time when an operation state of an engine body is in a low-load side operation range at a certain engine speed according to an embodiment of the present disclosure.

FIG. 8 is a chart illustrating the open periods (the valve timing) of the intake valve 21 and the exhaust valve 22 in a single rotation (clockwise rotation) of the crankshaft at the time when the operation state of the engine body 10 is in the low-load side operation range at a certain engine speed. In the lift characteristics illustrated in FIG. 8, the open periods (the valve timing) of the intake valve 21 and the exhaust valve 22 differ from the open periods (the valve timing) of the lift characteristics in FIG. 5. The opening timing of the intake valve 21 is 60° prior to the compression bottom dead center, and the closing timing of the intake valve 21 is 60° prior to the compression bottom dead center. In addition, the opening timing of the exhaust valve 22 is 80° prior to the compression bottom dead center, and the closing timing of the exhaust valve 22 is 60° prior to the compression bottom dead center.

Figure 9:
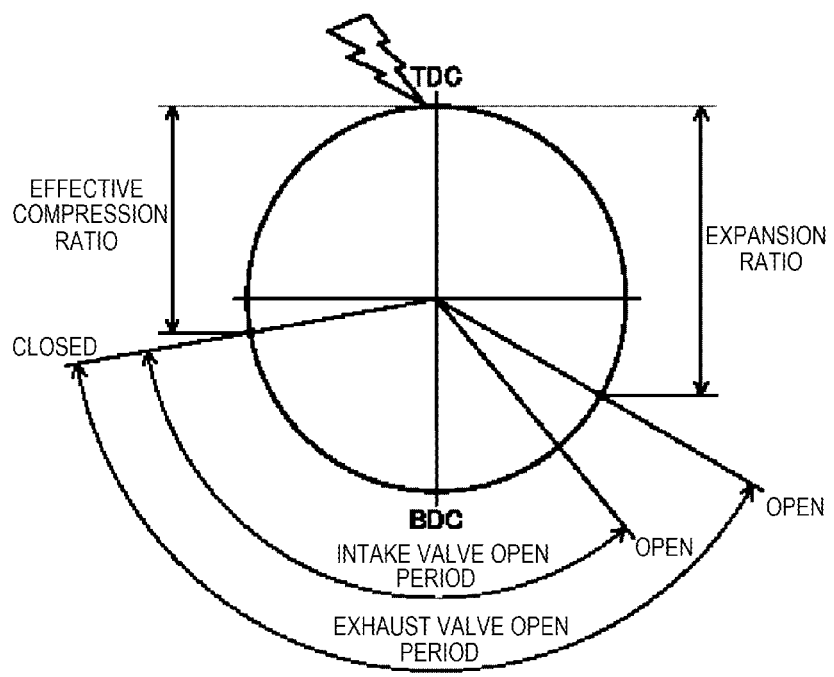
FIG. 9 is a chart illustrating the open periods (the valve timing) of the intake valve and the exhaust valve in the single rotation (the clockwise rotation) of the crankshaft at the time when the operation state of the engine body is in a high-load side operation range at the same engine speed as that in FIG. 8.

FIG. 9 is a chart illustrating the open periods (the valve timing) of the intake valve 21 and the exhaust valve 22 in the single rotation (the clockwise rotation) of the crankshaft at the time when the operation state of the engine body 10 is in the high-load side operation range at the same engine speed as that in FIG. 8. In the lift characteristics illustrated in FIG. 9, the closing timing (and the opening timing) of the intake valve 21 is retarded from the closing timing (the opening timing) of the intake valve 21 in FIG. 8, and the opening timing (and the closing timing) of the exhaust valve 22 is retarded from the opening timing (and the closing timing) of the exhaust valve 22 in FIG. 8. In this embodiment, a retarded amount of the closing timing of the intake valve 21 with respect to the lift characteristic in FIG. 8 is equal to (approximately 20°) a retarded amount of the opening timing of the exhaust valve 22 with respect to the lift characteristic in FIG. 8. Both of these retarded amounts may differ from each other as long as the above particular conditions are satisfied. For example, the retarded amount of the closing timing of the intake valve 21 with respect to the lift characteristic in FIG. 8 only needs to be equal to or larger than 20° and equal to or smaller than 30°, and the retarded amount of the opening timing of the exhaust valve 22 with respect to the lift characteristic in FIG. 8 only needs to exceed 0° and to be equal to or smaller than 20°.

Due to the retardation of the closing timing of the intake valve 21, a position of the piston 15 at initiation of compression approaches a position near the compression top dead center, and the effective compression ratio is reduced. Meanwhile, the intake air that is supercharged by the mechanical supercharger 53 is supplied to the combustion chamber 16. Thus, even in the case where the intake valve 21 is opened at the time when the piston 15 is operated toward the compression top dead center, the intake air, which has been supplied to the combustion chamber 16, is not blown back to the intake port 19. Accordingly, the effective compression ratio can be reduced by retarding the closing timing of the intake valve 21 while the intake amount remains constant. For this reason, when the operation state of the engine body 10 is in the high-load side operation range, the effective compression ratio can be reduced by retarding the closing timing of the intake valve 21 while a change in engine torque is reduced. As a result, even when the ignition retardation is not conducted, it is possible to prevent the occurrence of the abnormal combustion such as knocking. Thus, in this embodiment, near the compression top dead center in the compression stroke, the ignition plug 24 is actuated, and the fuel is subject to spark ignition combustion.

In the case where the spark ignition is conducted near the compression top dead center in the compression stroke, just as described, compared to the case where the ignition retardation is conducted, the expansion ratio is increased. The expansion ratio is determined by a period from the spark ignition (the compression top dead center in the case where timing of the spark ignition is earlier than the compression top dead center) to the opening timing of the exhaust valve 22. In addition, in this embodiment, the opening timing of the exhaust valve 22 is retarded from that in the lift characteristic illustrated in FIG. 8. Thus, the expansion ratio can further be increased.

In this embodiment, when the operation state of the engine body 10 is in the low-load side operation range, the ECU 100 estimates the compression end temperature, which is a temperature of gas in the combustion chamber 16 at the compression top dead center, on the basis of the outside temperature estimated from a detection result by the intake temperature sensor SN4, the engine speed calculated from the detection result by the crank angle sensor SN1, and the current effective compression ratio of the engine body 10. For this reason, the ECU 100 constitutes compression end temperature estimation means that estimates the compression end temperature. Upon estimation of the compression end temperature, in addition to the outside temperature, the engine speed, and the effective compression ratio, a detection result by the engine coolant temperature sensor SN5 and a detection result by the oil temperature sensor SN6 may be considered.

In addition, when the operation state of the engine body 10 is in the low-load side operation range, the ECU 100 actuates the intake electric S-VT 30 and the exhaust electric S-VT 40 in order to vary the closing timing of the intake valve 21 and the exhaust valve 22 within a specified range (a specified crank angle range) according to the thus-estimated compression end temperature (hereinafter, an estimated compression end temperature). The specified range is a range ±10° with the closing timing of the case with the lift characteristics illustrated in FIG. 8, for example. In this way, the compression end temperature can be changed within a temperature range of approximately 100K, usually, the estimated compression end temperature can fall within the specified temperature range. The above specified temperature range is a temperature range where the self-ignition and the combustion of the fuel are appropriately implemented. The above specified temperature range is a range of 1000K±20K, for example.

More specifically, in the case where the estimated compression end temperature is in the specified temperature range, the ECU 100 maintains the current effective compression ratio (does not actuate the intake electric S-VT 30 and the exhaust electric S-VT 40).

In the case where the estimated compression end temperature exceeds the specified temperature range at the time when the operation state of the engine body 10 is in the low-load side operation range, the ECU 100 varies the closing timing of each of the intake valve 21 and the exhaust valve 22 to the retarded side within a range where the particular conditions are satisfied. A variation to the retarded side is determined according to an excess amount from a maximum value of the specified temperature range of the estimated compression end temperature, and is increased as the excess amount is increased. That is, the estimated compression end temperature of a case where it is assumed that the closing timing of the intake valve 21 and the exhaust valve 22 is varied to the retarded side (the effective compression ratio is reduced) falls within the specified temperature range. However, the closing timing of the intake valve 21 and the exhaust valve 22 after being varied is limited within the above specified range. In this embodiment, the variation in the closing timing of the intake valve 21 to the retarded side is equal to the variation in the closing timing of the exhaust valve 22 to the retarded side.

In the case where the estimated compression end temperature falls below the specified temperature range at the time when the operation state of the engine body 10 is in the low-load side operation range, the ECU 100 varies the closing timing of each of the intake valve 21 and the exhaust valve 22 to the advanced side within the range where the particular conditions are satisfied. A variation to the advanced side is determined according to an amount that falls below a minimum value of the specified temperature range of the estimated compression end temperature, and is increased as the falling amount is increased. That is, the estimated compression end temperature of a case where it is assumed that the closing timing of the intake valve 21 and the exhaust valve 22 is varied to the advanced side (the effective compression ratio is increased) falls within the specified temperature range. However, the closing timing of the intake valve 21 and the exhaust valve 22 after being varied is limited within the above specified range. In this embodiment, the variation in the closing timing of the intake valve 21 to the advanced side is equal to the variation in the closing timing of the exhaust valve 22 to the advanced side.

A relationship between the excess amount and the variation to the retarded side and a relationship between the falling amount and the variation to the advanced side are determined in advance as the variation map (stored in the ROM of the memory 102).

In this embodiment, when the operation state of the engine body 10 is in the high-load side operation range, the compression end temperature is not estimated. The closing timing of each of the intake valve 21 and exhaust valve 22 is set at specified timing (varies according to the engine speed) regardless of the compression end temperature. In this way, the opening timing of the exhaust valve 22 is also determined. The closing timing of the intake valve 21 at the time when the operation state of the engine body 10 is in the high-load side operation range is retarded from the closing timing of the intake valve 21 at the time when the closing timing thereof is retarded at the maximum according to the estimated compression end temperature at the time when the operation state of the engine body 10 is in the low-load side operation range at the same engine speed as the engine speed in the high-load side operation range. In addition, the opening timing of the exhaust valve 22 at the time when the operation state of the engine body 10 is in the high-load side operation range is retarded from the opening timing of the exhaust valve 22 at the time when the opening timing thereof is retarded at the maximum together with the closing timing of the intake valve 21 according to the estimated compression end temperature at the time when the operation state of the engine body 10 is in the low-load side operation range at the same engine speed as the engine speed in the high-load side operation range. In this embodiment, even in the case where the engine coolant temperature by the engine coolant temperature sensor SN5 is lower than the set temperature, and the spark ignition combustion is conducted, the closing timing of the intake valve 21 and the exhaust valve 22 is set to the same specified timing as that when the operation state of the engine body 10 is in the high-load side operation range. However, the closing timing of the intake valve 21 and the exhaust valve 22 may be different timing therefrom.

Figure 10:
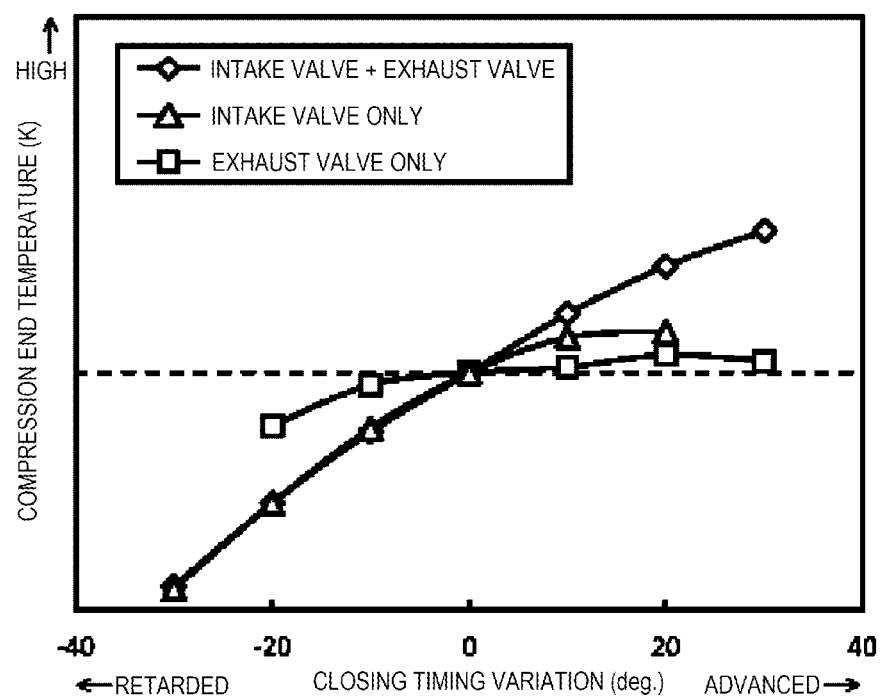
FIG. 10 is a graph illustrating a change in a compression end temperature at the time when the intake valve and/or the exhaust valve is retarded or advanced according to an embodiment of the present disclosure.
Figure 11:
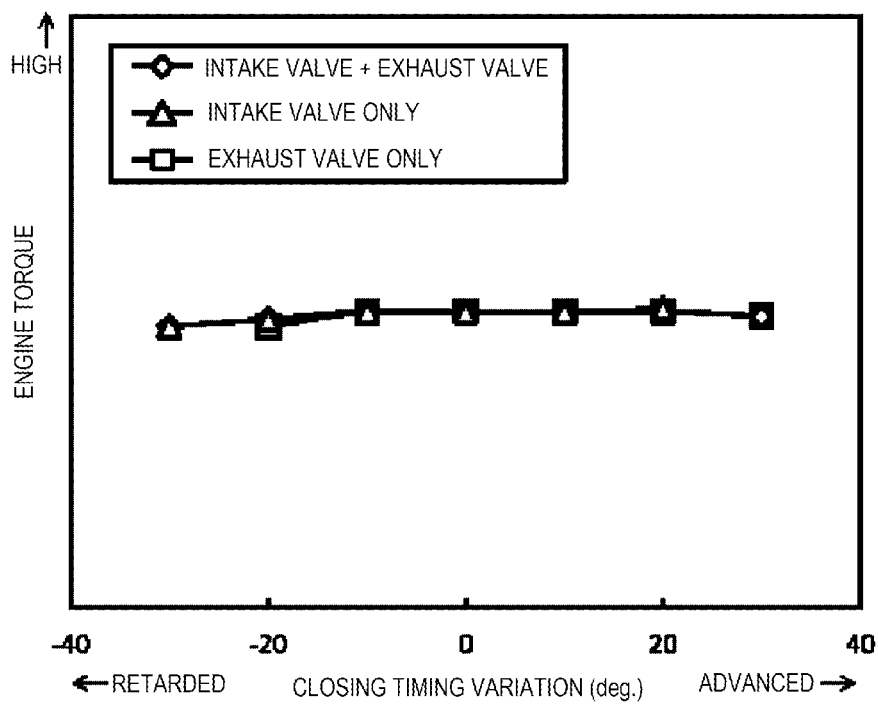
FIG. 11 is a graph illustrating a change in engine torque at the time when the intake valve and/or the exhaust valve is retarded or advanced according to an embodiment of the present disclosure.

FIG. 10 illustrates a result of calculation of a change in the compression end temperature by a simulation at the time when the closing timing of the intake valve 21 and/or the exhaust valve 22 is regulated. FIG. 11 illustrates a result of calculation of a change in the engine torque (output torque of the engine body 10) by the simulation at the time when the closing timing of the intake valve 21 and/or the exhaust valve 22 is regulated. In the simulations illustrated in FIG. 10 and FIG. 11, the engine speed is set at 1500 rpm, and the air-fuel ratio is set to A/F=30.

In FIG. 10, a vertical axis represents the compression end temperature, and a horizontal axis represents the variation in the closing timing of the intake valve 21 and/or the exhaust valve 22 (the variation at the crank angle). The horizontal axis is represented such that a retarded side from the closing timing in the case of the lift characteristics illustrated in FIG. 5 as a reference (0°) is set as a negative side and an advanced side therefrom is set as a positive side. Also, in the simulations illustrated in FIG. 10 and FIG. 11, when the closing timing varies, the opening timing also varies in an interlocking manner. In the graph illustrated in FIG. 10, a curve with rhombic marks indicates a case where the intake valve 21 and the exhaust valve 22 are synchronized and where the closing timing thereof is retarded or advanced by the same amount, a curve with triangle marks indicates a case where only the intake valve 21 is retarded or advanced, and a curve with square marks indicates a case where only the exhaust valve 22 is retarded or advanced. A dotted line illustrated in FIG. 10 represents a central value of the specified temperature range. In this simulation, such a condition is set that the opening timing of the intake valve 21 does not precede the opening timing of the exhaust valve 22. Accordingly, the advance amount in the case where only the closing timing of the intake valve 21 is advanced is up to approximately 20°, and the retarded amount in the case where only the closing timing of the exhaust valve 22 is retarded is also up to approximately 20°. In addition, in this simulation, a delay in the closing timing of the exhaust valve 22 from the closing timing of the intake valve 21 is permitted.

In FIG. 11, a vertical axis represents the engine torque, and a horizontal axis represents the variation in the closing timing of the intake valve 21 and/or the exhaust valve 22. The representation of the horizontal axis and the curves with the marks, each of which indicates an advancement or retardation target, are the same as those in FIG. 10.

As illustrated in FIG. 10, it is understood that, in the case where the intake valve 21 and the exhaust valve 22 are synchronized to retard the closing timing, the compression end temperature is reduced as the retarded amount is increased. It is also understood that, in the case where only the closing timing of the intake valve 21 is retarded, the compression end temperature is reduced in a similar manner to the case where the intake valve 21 and the exhaust valve 22 are synchronized. This is because, due to the retardation of the closing timing of the intake valve 21, the position of the piston 15 at the initiation of the compression becomes the position near the compression top dead center, and the effective compression ratio thereby varies.

It is understood that, in the case where only the closing timing of the exhaust valve 21 is retarded, the compression end temperature is only slightly reduced. As described above, in the current simulation, when the closing timing varies, the opening timing also varies in the interlocking manner. Due to the retardation of the opening timing of the exhaust valve 22, the exhaust valve 22 is opened when an in-cylinder pressure is low, and thus the exhaust gas is less likely to be discharged. Accordingly, an amount of the exhaust gas in the combustion chamber 16 at the initiation of the compression is increased. As a result, even when the exhaust valve 22 is retarded to reduce the effective compression ratio, the compression end temperature is less likely to be reduced.

Figure 12:
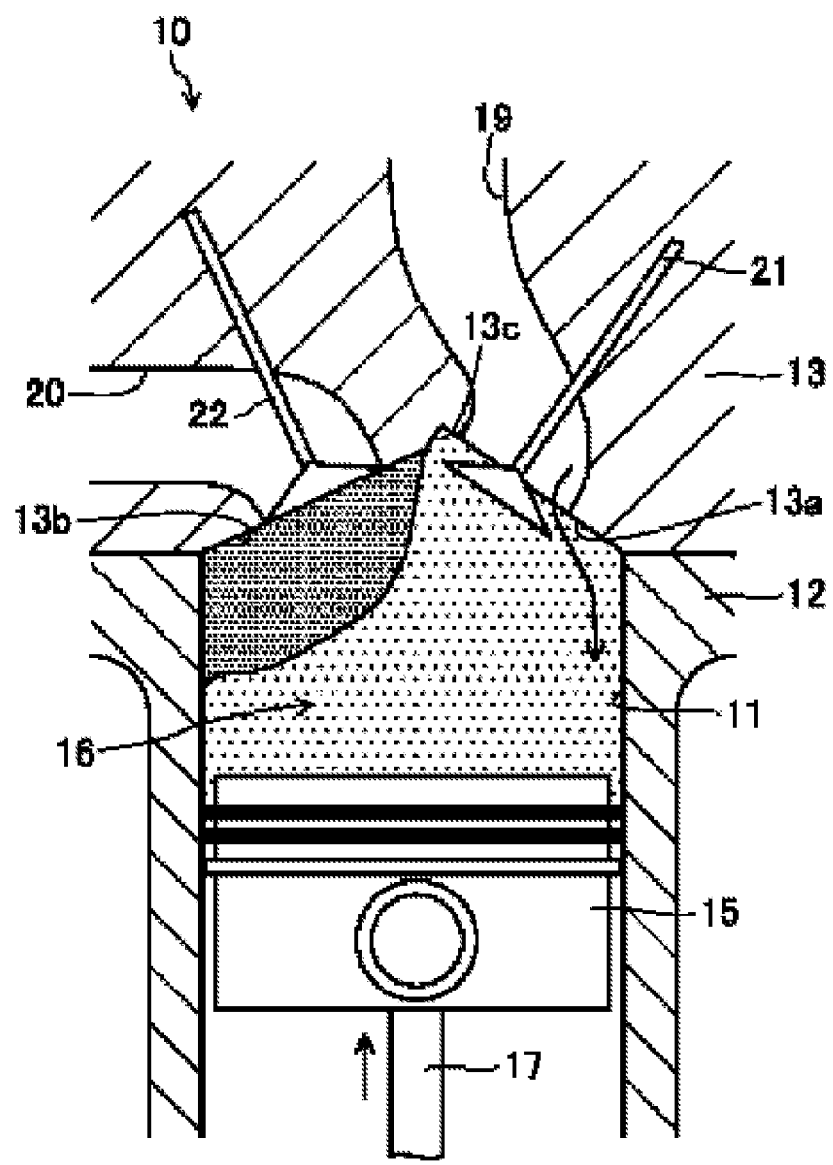
FIG. 12 is a view illustrating a state of the inside of the cylinder in the case where only the intake valve is opened according to an embodiment of the present disclosure.

In the case where only the closing timing of the intake valve 21 is retarded, as illustrated in FIG. 12, only the intake valve 21 is in an open state at the time when the piston 15 is located at the position near the compression top dead center. However, in this embodiment, the intake air is mainly supplied to the combustion chamber 16 from the portion on the far side from the exhaust port 20 in the clearance between the intake valve 21 and the cylinder head 13. Thus, a channel area between the intake port 19 and the combustion chamber 16 is substantially reduced. The intake air that is supplied from the intake port 19 to the combustion chamber 16 is the intake air that has been supercharged by the mechanical supercharger 53. For these reasons, in this embodiment, as illustrated in FIG. 12, even in the case where only the intake valve 21 is opened at the time when the piston 15 is being lifted, the supercharged intake air is supplied to the combustion chamber 16, and thus the supercharged intake air is hardly blown back from the combustion chamber 16 to the intake port 19.

In the case where the intake air is hardly blown back from the combustion chamber 16 to the intake port 19, the intake amount to be supplied to the combustion chamber 16 is constant. In detail, in the case where the engine speed is constant, and the rotational speed of the compressor 53a in the mechanical supercharger 53 is constant, the discharge flow rate from the mechanical supercharger 53 is constant. Then, in the case where the discharge flow rate from the mechanical supercharger 53 is constant, and the intake air is not blown back from the combustion chamber 16 to the intake port 19, the intake amount to be supplied to the combustion chamber 16 is constant. Accordingly, as illustrated in FIG. 11, the engine torque hardly varies even in the case where the closing timing of the intake valve 21 is retarded.

Figure 13:
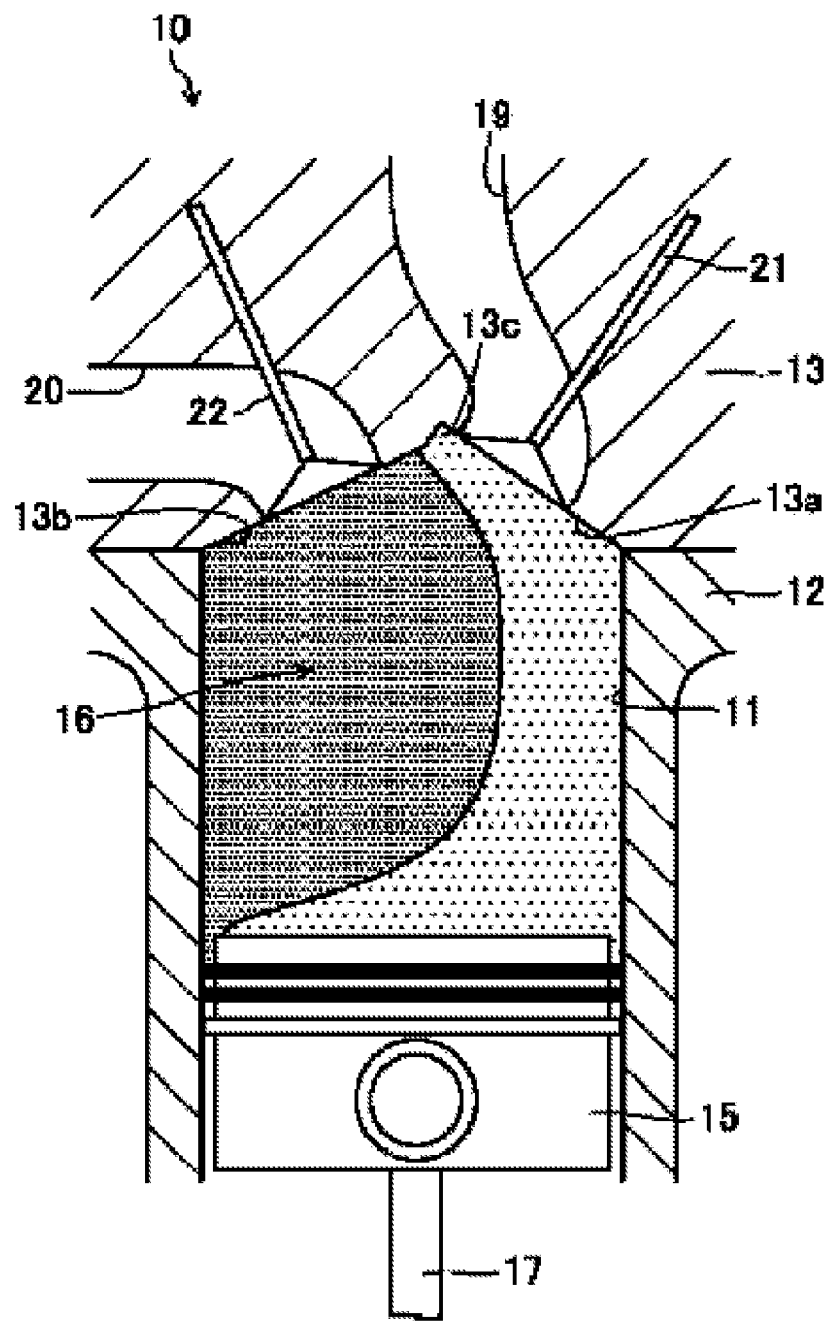
FIG. 13 is a view illustrating a state of the inside of the cylinder in the case where closing timing of the intake valve and the exhaust valve is advanced according to an embodiment of the present disclosure.

With reference to FIG. 10, it is understood that, in the case where the intake valve 21 and the exhaust valve 22 are synchronized to advance the closing timing of each thereof, the compression end temperature is increased as the advance amount is increased. This is because the effective compression ratio is increased and because the amount of the exhaust gas in the combustion chamber 16 is increased. More specifically, as illustrated in FIG. 13, in the case where the intake valve 21 and the exhaust valve 22 are synchronized to advance the closing timing of each thereof, the compression of the gas in the combustion chamber 16 is initiated at a position where the piston 15 is further away from the compression top dead center, and thus the effective compression ratio is reduced. In addition, in the case where the closing timing of the intake valve 21 is advanced, the intake air is supplied to the combustion chamber 16 at a position where the piston 15 is located near the compression bottom dead center. Thus, due to the supply of the intake air to the combustion chamber 16, a scavenging pressure at the time when the exhaust gas in the combustion chamber 16 is scavenged is reduced. As a result, scavenging of the exhaust gas is suppressed. Thus, as illustrated in FIG. 13, the amount of the exhaust gas in the combustion chamber 16 at the initiation of the compression is increased.

With reference to FIG. 10, in the case where only the closing timing of the intake valve 21 is advanced, the compression end temperature is increased. However, compared to the case where the intake valve 21 and the exhaust valve 22 are synchronized, it is understood that an increase amount of the compression end temperature is small. In the case where only the closing timing of the intake valve 21 is advanced, the closing timing of the exhaust valve 22 is later than the closing timing of the intake valve 21. Thus, the effective compression ratio is determined by the closing timing of the exhaust valve 22. In the case where only the intake valve 21 is advanced, the effective compression ratio hardly varies. Meanwhile, as described above, the scavenging pressure at the time when the exhaust gas in the combustion chamber 16 is scavenged is reduced, and the amount of the exhaust gas in the combustion chamber 16 at the initiation of the compression is increased. Accordingly, even in the case where only the closing timing of the intake valve 21 is advanced, the compression end temperature is increased. However, compared to the case where the intake valve 21 and the exhaust valve 22 are synchronized, the increase amount of the compression end temperature is small. In addition, when the advance amount is 20°, the compression end temperature hardly varies from a time when the advance amount is 10°. This is because the effective compression ratio is determined by the closing timing of the exhaust valve 22 and because the effective compression ratio does not vary even when the closing timing of the intake valve 21 is advanced.

Furthermore, with reference to FIG. 10, it is understood that, in the case where only the closing timing of the exhaust valve 22 is advanced, the compression end temperature hardly varies. This is because, even when only the closing timing of the exhaust valve 22 is advanced, the closing timing of the intake valve 21 remains the same, and thus the effective compression ratio does not vary.

As described above, even in the case where the engine speed is constant, and the intake valve 21 is advanced, the intake amount to be supplied to the combustion chamber 16 is constant. Accordingly, as illustrated in FIG. 11, the engine torque hardly varies even in the case where the closing timing of the intake valve 21 is advanced.

As described above, in this embodiment, when the operation state of the engine body 10 is in the low-load side operation range, the closing timing of the intake valve 21 and the exhaust valve 22 is regulated such that the compression end temperature falls within the specified temperature range. Accordingly, the self-ignition and the combustion of the fuel can appropriately be conducted while the change in the engine torque is suppressed.

Figure 14:
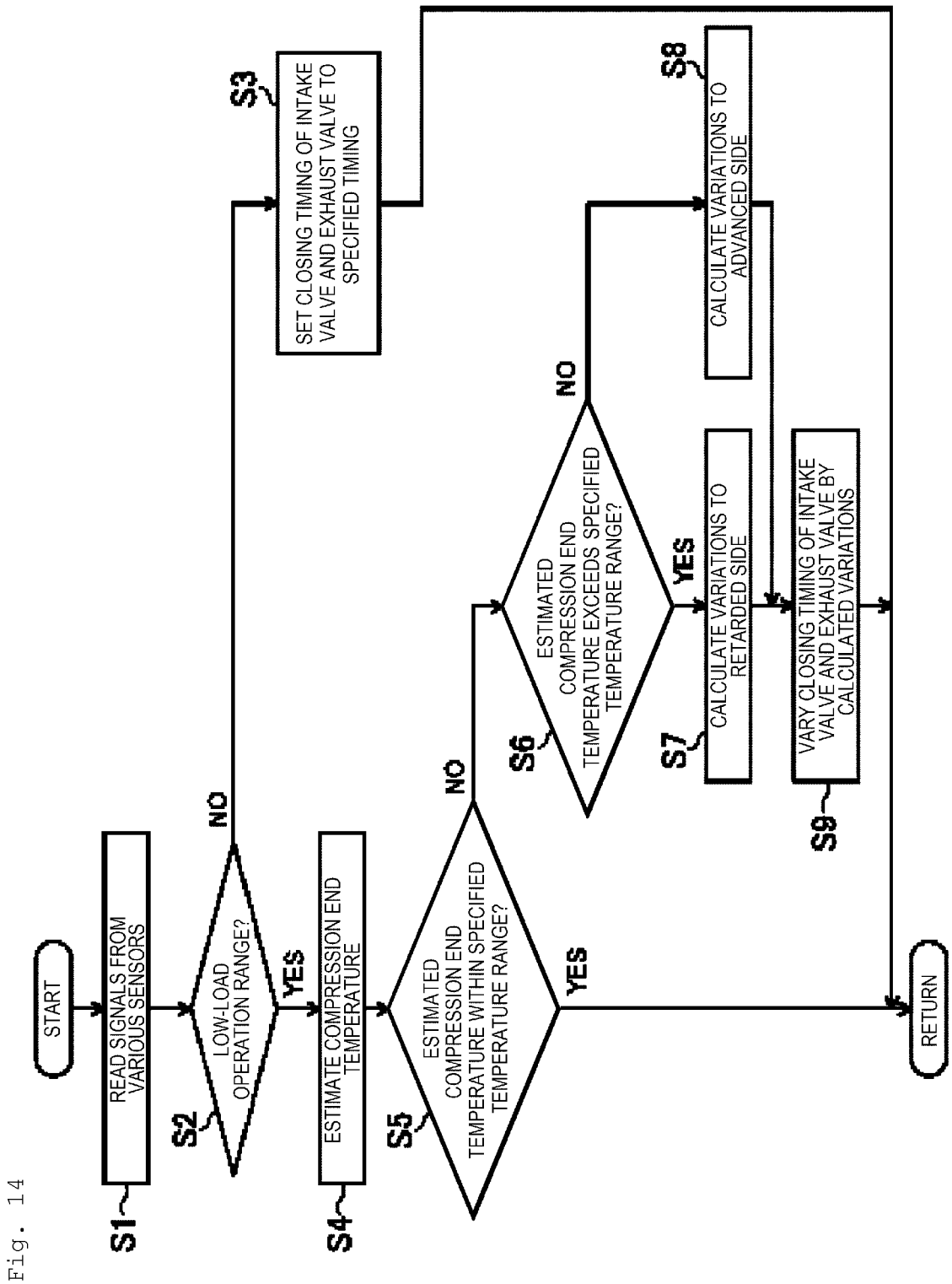
FIG. 14 is a flowchart illustrating processing operation of an ECU that relates to control of intake electric S-VT and exhaust electric S-VT at the time when an engine coolant temperature is equal to or higher than a predetermined set temperature according to an embodiment of the present disclosure.

Next, a processing operation of the ECU 100 will be described that relates to the control of the intake electric S-VT 30 and the exhaust electric S-VT 40 at the time when the engine coolant temperature by the engine coolant temperature sensor SN5 is equal to or higher than the set temperature with reference to a flowchart in FIG. 14. The processing operation based on this flowchart is executed per single combustion cycle while the engine 1 is actuated.

In the first step S1, the signals from the various sensors are read. In the next step S2, it is determined whether the operation state of the engine body 10 is in the low-load side operation range.

If the determination in step S2 is NO (if the operation state of the engine body 10 is in the high-load side operation range), the processing proceeds to step S3, and the closing timing of the intake valve 21 and the exhaust valve 22 is set at the specified timing, which is determined by the engine speed.

On the other hand, if the determination in step S2 is YES, the processing proceeds to step S4, and the compression end temperature is estimated on the basis of the outside temperature, which is estimated from the detection result by the intake temperature sensor SN4, and the current effective compression ratio of the engine body 10.

In the next step S5, it is determined whether the estimated compression end temperature, which is estimated in step S4, is in the specified temperature range. If the determination in this step S5 is YES, the processing returns as it is. On the other hand, if the determination in step S5 is NO, the processing proceeds to step S6.

In step S6, it is determined whether the estimated compression end temperature exceeds the specified temperature range. If the determination in this step S6 is YES, the processing proceeds to step S7, and the variations in the closing timing of the intake valve 21 and the exhaust valve 22 to the retarded side are calculated by using the variation map. On the other hand, if the determination in step S6 is NO, the processing proceeds to step S8, and the variations in the closing timing of intake valve 21 and the exhaust valve 22 to the advanced side are calculated by using the variation map.

After step S7 or step S8, the processing proceeds to step S9. Then, the closing timing of the intake valve 21 and the exhaust valve 22 are varied by the variations calculated in step S7 or step S8. Thereafter, the processing returns.

Accordingly, in this embodiment, when the operation state of the engine body 10 is in the high-load side operation range, the closing timing of the intake valve 21 and the opening timing of the exhaust valve 22 are retarded from those at the same engine speed and in the low-load side operation range while the particular conditions are satisfied. Therefore, when the operation state of the engine body 10 is in the high-load side operation range, it is possible to improve fuel efficiency while preventing the occurrence of abnormal combustion such as knocking.

The present disclosure is not limited to the above embodiment and includes a range of embodiments that do not depart from the gist of the claims.

For example, in the above embodiment, both of the intake variable valve mechanism and the exhaust variable valve mechanism are of the phase type. Thus, when the closing timing of the intake valve 21 and the opening timing of the exhaust valve 22 are varied, the opening timing of the intake valve 21 and the closing timing of the exhaust valve 22 are simultaneously advanced or retarded. However, the intake variable valve mechanism and the exhaust variable valve mechanism are not limited to those of the phase type. The intake variable valve mechanism and the exhaust variable valve mechanism may be configured to vary valve lift amounts, and may be configured to be able to advance or retard only the closing timing of the intake valve 21 and only the opening timing of the exhaust valve 22 due to the change in this valve lift amount.

The above-described embodiment is merely illustrative, and thus the scope of the present disclosure should not be interpreted in a restrictive manner. The scope of the present disclosure is defined by the claims, and all modifications and changes falling within equivalents of the claims fall within the scope of the present disclosure.

The present disclosure is useful for the two-stroke engine with the supercharger, the two-stroke engine including: the engine body that has the cylinder constituting the combustion chamber, the piston inserted in and fitted to the cylinder, and the intake valve and the exhaust valve arranged on top of the cylinder and respectively opening/closing the intake port and the exhaust port; and the supercharger that is provided in the intake passage connected to the intake port of the engine body.

What is claimed is:

1. A two-stroke engine with a supercharger, the two-stroke engine including: an engine body that has a cylinder constituting a combustion chamber, a piston inserted in and fitted to said cylinder, and an intake valve and an exhaust valve arranged on top of the cylinder and respectively opening/closing an intake port and an exhaust port; and a supercharger that is provided in an intake passage connected to the intake port of said engine body, the two-stroke engine with the supercharger further comprising:

an intake variable valve mechanism capable of varying at least closing timing of the intake valve;

an exhaust variable valve mechanism capable of varying at least opening timing of the exhaust valve;

engine speed detection means that detects an engine speed as a speed of the engine body; and control means that controls actuation of the engine body including the intake variable valve mechanism and the exhaust variable valve mechanism, wherein an open period of each of the intake valve and the exhaust valve is set to satisfy particular conditions that are that the open period includes compression bottom dead center, that the opening timing of the intake valve is later than the opening timing of the exhaust valve, and that the closing timing of the intake valve is substantially the same as closing timing of the exhaust valve or later than the closing timing of the exhaust valve, wherein the control means is configured to conduct compression self-ignition combustion, in which fuel is compressed to ignite by itself in the combustion chamber, when an operation state of the engine body is in a low-load side operation range where a load is smaller than a specified load and to conduct spark ignition combustion of the fuel in the combustion chamber when the operation state of the engine body is in a high-load side operation range, in which the load is equal to or larger than the specified load, wherein the supercharger is configured to be actuated when the operation state of the engine body is in the low-load side operation range or the high-load side operation range, and wherein the control means is further configured to actuate the intake variable valve mechanism and the exhaust variable valve mechanism in order to retard at least the closing timing of the intake valve and at least the opening timing of the exhaust valve from those in a case where the operation state of the engine body is in the low-load side operation range at the same engine speed as the engine speed detected by the engine speed detection means while the particular conditions are satisfied, when the operation state of the engine body is in the high-load side operation range.

2. The two-stroke engine with the supercharger according to claim 1 further comprising:

outside temperature detection means that detects an outside temperature; and compression end temperature estimation means that estimates a compression end temperature as a temperature of gas in the combustion chamber at compression top dead center on the basis of a detection result by each of the outside temperature detection means and the engine speed detection means and a current effective compression ratio of the engine body when the operation state of the engine body is in the low-load side operation range, wherein the control means is configured to actuate the variable valve mechanism in order to vary at least the closing timing of the intake valve within a specified range according to the compression end temperature estimated by the compression end temperature estimation means when the operation state of the engine body is in the low-load side operation range, and wherein the closing timing of the intake valve at the time when the operation state of the engine body is in the high-load side operation range is retarded from the closing timing of the intake valve at the time when said closing timing is retarded at a maximum according to the compression end temperature at the time when the operation state of the engine body is in the low-load side operation range at the same engine speed as the engine speed in said high-load side operation range.

3. The two-stroke engine with the supercharger according to claim 2, wherein the intake variable valve mechanism comprises a variable valve mechanism of a phase type that varies both of the opening timing and the closing timing of the intake valve in an interlocking manner while keeping the open period of said intake valve constant, and wherein the exhaust variable valve mechanism comprises a variable valve mechanism of the phase type that varies both of the opening timing and the closing timing of the exhaust valve in an interlocking manner while keeping the open period of said exhaust valve constant.

4. The two-stroke engine with the supercharger according to claim 1, wherein the intake variable valve mechanism comprises a variable valve mechanism of a phase type that varies both of the opening timing and the closing timing of the intake valve in an interlocking manner while keeping the open period of said intake valve constant, and wherein the exhaust variable valve mechanism comprises a variable valve mechanism of the phase type that varies both of the opening timing and the closing timing of the exhaust valve in an interlocking manner while keeping the open period of said exhaust valve constant.

\* \* \* \* \*